(12) United States Patent
Wang et al.

(10) Patent No.: US 11,717,833 B1
(45) Date of Patent: Aug. 8, 2023

(54) ENVIRONMENT-FRIENDLY CONSTRUCTION WASTE TREATMENT EQUIPMENT FOR CIVIL ENGINEERING

(71) Applicant: Jinggangshan University, Ji'an (CN)

(72) Inventors: Zhenwu Wang, Ji'an (CN); Xiaoling Liao, Ji'an (CN)

(73) Assignee: Jinggangshan University, Ji'an (CN)

( * ) Notice: Subject to any disclaimer, the term of this patent is extended or adjusted under 35 U.S.C. 154(b) by 0 days.

(21) Appl. No.: 18/180,482

(22) Filed: Mar. 8, 2023

(30) Foreign Application Priority Data

Mar. 11, 2022 (CN) .......................... 202210236165.3

(51) Int. Cl.
*B02C 4/40* (2006.01)
*B02C 4/08* (2006.01)
*B02C 4/42* (2006.01)
*B02C 23/10* (2006.01)

(52) U.S. Cl.
CPC .................. *B02C 4/40* (2013.01); *B02C 4/08* (2013.01); *B02C 4/42* (2013.01); *B02C 23/10* (2013.01); *B02C 2201/06* (2013.01)

(58) Field of Classification Search
CPC ............... B02C 4/08; B02C 4/40; B02C 4/42
USPC ................................................... 241/79, 79.2
See application file for complete search history.

(56) References Cited

FOREIGN PATENT DOCUMENTS

| CN | 208373237 U | | 1/2019 |
| CN | 113351334 | * | 6/2021 |
| CN | 113351334 A | | 9/2021 |

OTHER PUBLICATIONS

First Office Action dated Nov. 10, 2022, for priority Chinese Patent Application No. 202210236165.3.

* cited by examiner

*Primary Examiner* — Shelley M Self
*Assistant Examiner* — Smith Oberto Bapthelus
(74) *Attorney, Agent, or Firm* — Renner, Otto, Boisselle & Sklar, LLP

(57) ABSTRACT

An environment-friendly construction waste treatment equipment for civil engineering is provided, including a main frame, a wringing frame, first fixing columns, a second fixing column, an electric motor, etc. wherein the first fixing column is provided on each of front and rear sides of a left side of an upper portion of the main frame, the wringing frame is provided between the first fixing columns, the second fixing column is provided on rear and left sides of the upper portion of the main frame, and the electric motor is provided on the second fixing column. The electric motor is turned on, the wringing wheels wring the construction waste, the wringed construction waste falls onto the conveying belt, and then is transferred to the filtering plate via the conveying belt. In this way, as the construction waste is conveyed via the conveying belt, the equipment is prevented from being blocked.

5 Claims, 15 Drawing Sheets

US 11,717,833 B1

ENVIRONMENT-FRIENDLY CONSTRUCTION WASTE TREATMENT EQUIPMENT FOR CIVIL ENGINEERING

CROSS REFERENCE TO RELATED APPLICATION

This patent application claims the benefit and priority of Chinese Patent Application No. 202210236165.3, entitled "Environment-friendly Construction Waste Treatment Equipment for Civil Engineering" filed on Mar. 11, 2022, the disclosure of which is incorporated by reference herein in its entirety as part of the present application.

TECHNICAL FIELD

The present disclosure relates to an equipment for treating construction waste, and in particular, to an environment-friendly construction waste treatment equipment for civil engineering.

BACKGROUND ART

With the accelerating of urbanization process, the rapid development of urban reconstruction and construction industries, in addition to the aging and the expiration of service life of some old buildings and urban infrastructures, make more and more civil engineering construction projects scrapped and removed, and further generate a large amount of construction removal waste and garbage, and the construction waste is recycled and then reused, which is a reasonable approach and method for treating the construction waste.

The Chinese Patent Application NO. CN 208373237 U discloses a device for treating and recycling construction waste, including a box body, in which a crushing tube is fixedly provided on an inner wall of an upper end of the box body, an upper end of a right side wall of the box body is fixedly provided with an electric motor box, and an inner wall of a right side of the electric motor box is fixedly provided with a first electric motor, an output end of the first electric motor is fixedly provided with a first rotating shaft; an end of the first rotating shaft far away from the first electric motor sequentially passes through a left side wall of the electric motor box, a right side wall of the box body and a right side wall of the crushing tube and extends into the crushing tube, and a shaft wall of the first rotating shaft is fixedly provided with a plurality of crushing blades evenly distributed, and the upper end of the box body is in communication with a feeding hopper; a U-shaped frame is horizontally provided inside the box body, a filter screen is provided on an inner wall of the U-shaped frame, a discharge hole is provided on the right side wall of the box body, and a second discharge tube obliquely provided is fixedly provided at a right opening of the discharge hole. The application is easy to operate, and can sufficiently screen and filter the waste after being crushed, thereby improving the filtering efficiency. However, the filter screen on the U-shaped frame of the device is horizontally provided, and when the U-shaped frame drives the filter screen to move from side to side, it is difficult to discharge larger waste through the second discharge tube provided on the right side wall of the box body, and the filter screen is prone to be recessed under the effect of impact force and pressure over a long period of time, making it more difficult to discharge larger waste, thereby causing the device to be blocked.

The technical problem to be solved by the present disclosure is how to design an environment-friendly construction waste treatment equipment for civil engineering which is convenient for discharging waste and further prevents to be blocked.

SUMMARY

In order to overcome the disadvantage in the prior art that the larger waste is difficult to be discharged, which further causes the device to be blocked, the technical problem to be solved is to provide an environment-friendly construction waste treatment equipment for civil engineering which is convenient for discharging the waste, further prevents to be blocked.

The technical solution of the present disclosure is: an environment-friendly construction waste treatment equipment for civil engineering including a main frame, a wringing frame, first fixing columns, a second fixing column, an electric motor, a first rotating shaft, a second rotating shaft, a gear train, wringing wheels, a conveying mechanism and a reciprocating mechanism. The first fixing column is provided on each of front and rear sides of a left side of an upper portion of the main frame, and the wringing frame for treating construction waste is provided between the first fixing columns, the second fixing column is provided on a rear side and a left side of the upper portion of the main frame, the electric motor is provided on the second fixing column, the first rotating shaft is rotatably provided on a left side of a lower portion of the wringing frame, and a rear side of the first rotating shaft is connected to an output shaft of the electric motor via a coupling, the second rotating shaft is rotatably provided on a right side of the lower portion of the wringing frame, the gear train is provided between a front side of the first rotating shaft and a front side of the second rotating shaft, the gear train includes two gears meshed with each other, the wringing wheel for wringing the construction waste is provided on each of middle parts of the first rotating shaft and the second rotating shaft, the conveying mechanism for conveying wringed construction waste is provided between a left side of the main frame and the wringing frame, the reciprocating mechanism for filtering the wringed construction waste is provided between a lower portion of the main frame and the conveying mechanism.

In one of the embodiments, the conveying mechanism includes third rotating shafts, a deceleration belt, a conveying belt, fixing rods and guiding plates. Two third rotating shafts are rotatably provided on a left side of a middle portion of the main frame, and the deceleration belt is wound between a front side of the third rotating shaft on a left side and a front side of the first rotating shaft via transmission wheels, the conveying belt for conveying the wringed construction waste is wound between the third rotating shafts via a conveying wheel, the fixing rod is rotatably provided between front and rear sides of each of the two third rotating shafts, and the guiding plate for guiding the construction waste falling downwards is fixedly provided on each of the left and right sides of the lower portion of the wringing frame.

In one of the embodiments, the reciprocating mechanism includes partially toothless gears, first racks, first sliding rods, first linear springs and a filtering plate, each of front and rear sides of the third rotating shaft on a right side is provided with the partially toothless gear, and each of front and rear sides of a right side of the lower portion of the main frame is provided with the first sliding rod, the filtering plate for filtering the wringed construction waste is slidably provided between the first sliding rods, and the first linear spring is connected between each of the first sliding rods and a left side of the filtering plate, each of front and rear sides of a right side of the filtering plate is provided with the first rack, and each of the first racks is meshed with the partially toothless gear on a same side.

In one of the embodiments, an adsorption mechanism configured for facilitating staff to collect iron blocks is further included. The adsorption mechanism includes a fourth rotating shaft, an adsorption wheel, first connecting rods, second sliding rods, sliding sleeves, second linear springs, dragging strings, second connecting rods and guiding wheels. The fourth rotating shaft is slidably and rotatably provided on an upper portion of the filtering plate, the adsorption wheel for adsorbing the iron blocks is provided on a middle portion of the fourth rotating shaft, each of front and rear sides of the fourth rotating shaft is provided with the first connecting rod, each of front and rear sides of the lower portion of the main frame is provided with the second sliding rod, each of the second sliding rods is slidably provided with the sliding sleeve, and each of the sliding sleeves is connected to the first connecting rod on a same side, the second linear spring is connected between each of the sliding sleeves and the second sliding rod on a same side, and each of front and rear sides of a right side of a lower portion of the filtering plate is provided with the second connecting rod, the dragging string is connected between each of the second connecting rods and the sliding sleeve on a same side, and each of front and rear sides of a left side of the lower portion of the main frame is provided with the guiding wheel, each of the dragging strings wraps around the guiding wheel on a same side.

In one of the embodiments, a scraping mechanism for cleaning the conveying belt is further included, and the scraping mechanism includes a third fixing column, rotating sleeves, a scraper, third linear springs, rotating rods, torsion springs and pushing rods. The third fixing column is provided on the left side of the lower portion of the main frame, the rotating sleeves are rotatably provided on the third fixing column, the scraper for cleaning the conveying belt is slidably provided on the rotating sleeves, the scraper is in contact with the conveying belt, the third linear spring is connected between the scraper and each of the rotating sleeves, and the rotating rod is provided on both of a front side and a rear side of a lower side of the rotating sleeve, two torsion springs are connected between the rotating sleeves and the third fixing column, the pushing rod is provided on each of front and rear sides of a left side of a bottom of the filtering plate, after the pushing rods move, each of the pushing rods is in contact with the rotating rod on a same side.

In one of the embodiments, a flipping mechanism for increasing adsorption range of the adsorption wheel is further included. The flipping mechanism includes fourth fixing columns, second racks and straight gears. The fourth fixing column is provided on each of the front and rear sides of the right side of the lower portion of the main frame, the second rack is provided on each of the fourth fixing columns, each of front and rear sides of the fourth rotating shaft is provided with the straight gear, each of the straight gears is meshed with the second rack on a same side.

In one of the embodiments, a protection mechanism for preventing debris from splashing is further included. The protection mechanism includes fifth rotating shafts, arc rods, baffles and arc springs. The fifth rotating shaft is rotatably provided on each of front and rear sides of an upper portion of the wringing frame, and two arc rods are provided on each of the front and rear sides of the upper portion of the wringing frame, the baffle for closing the wringing frame is provided on each of the fifth rotating shafts, and each of the baffles is slidably connected to two arc rods on a same side, the arc spring is connected between each of the arc rods and the baffle on a same side.

In one of the embodiments, an inner bottom surface of the filtering plate is obliquely provided.

The advantages of the present disclosure are:
1. The electric motor is turned on, the wringing wheels wring the construction waste, the wringed construction waste falls onto the conveying belt, and then is transferred to the filtering plate via the conveying belt. In this way, as the construction waste is conveyed via the conveying belt, the equipment is prevented from being blocked;
2. In the present disclosure, the filtering plate is repeatedly moved from side to side, so as to screen the wringed construction waste, so that smaller debris falls directly downwards, and the larger iron blocks and foreign objects and the like can slide rightwards via the filtering plate as the inner bottom surface thereof is provided obliquely, thereby facilitating the staff to recycle the recyclable objects;
3. In the present disclosure, the iron blocks on the filtering plate is adsorbed by the adsorption wheel, thereby facilitating the staff to collect the iron blocks;
4. In the present disclosure, the back and forth rotation of the scraper scrape mud, foreign objects, and the like from the conveying belt, and thereby the conveying belt is cleaned to prevent mud from sticking the recyclable objects to the conveying belt;
5. In the present disclosure, the back and forth rotation of the adsorption wheel, increase the adsorption range of the adsorption wheel, so that the adsorption wheel can adsorb more iron blocks;
6. In the present disclosure, when the wringing wheels wring the construction waste, debris can be prevented from splashing out to mistakenly damage the staff via the provided baffle.

Figure 1:
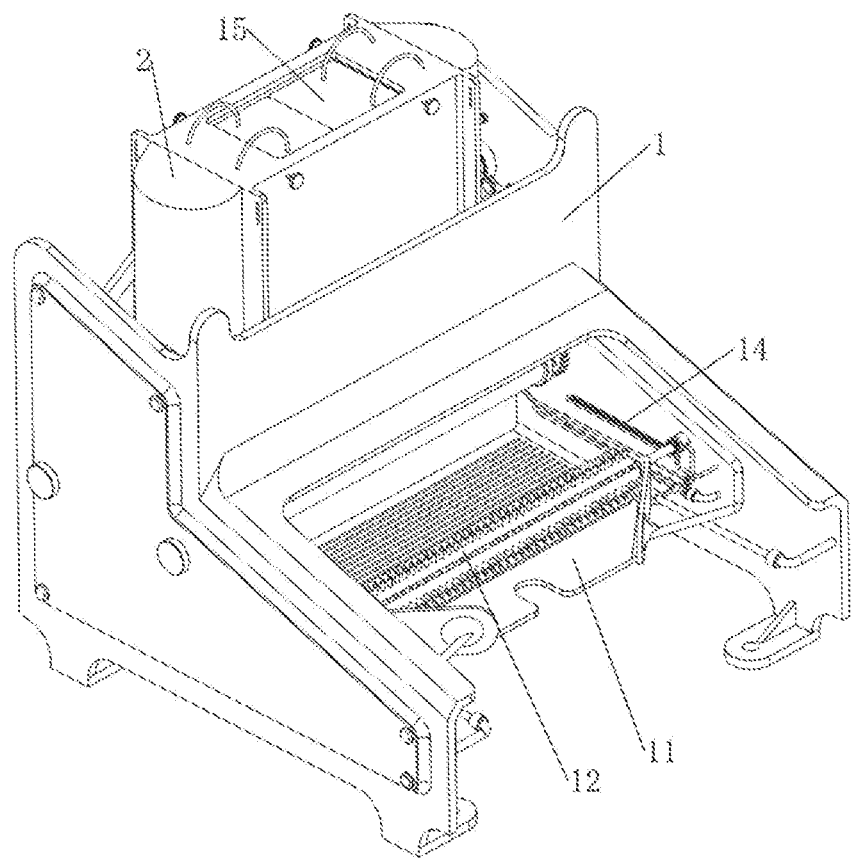
FIG. 1 is a perspective view of the present disclosure.

1-main frame, 2-wringing frame, 3-first fixing column, 4-second fixing column, 5-electric motor, 6-first rotating shaft, 7-second rotating shaft, 8-gear train, 9-wringing wheel, 10-conveying mechanism, 101-third rotating shaft, 102-deceleration belt, 103-conveying belt, 104-fixing rod, 105-guiding plate, 11-reciprocating mechanism, 111-partially toothless gear, 112-first rack, 113-first sliding rod, 114-first linear spring, 115-filtering plate, 12-adsorption mechanism, 121-fourth rotating shaft, 122-adsorption wheel, 123-first connecting rod, 124-second sliding rod, 125-sliding sleeve, 126-second linear spring, 127-dragging string, 128-second connecting rod, 129-guiding wheel, 13-scraping mechanism, 131-third fixing column, 132-rotating sleeve, 133-scraper, 134-third linear spring, 135-rotating rod, 136-torsion spring, 137-pushing rod, 14-flipping mechanism, 141-fourth fixing column, 142-second rack, 143-straight gear, 15-protection mechanism, 151-fifth rotating shaft, 152-arc rod, 153-baffle, 154-arc spring.

DETAILED DESCRIPTION OF THE EMBODIMENTS

The present disclosure will be further described in detail with reference to the accompanying drawings and specific embodiments, but shall not be construed to limit the scope of protection and disclosure of the present disclosure.

Embodiment 1

An environment-friendly construction waste treatment equipment for civil engineering, referring to FIGS. 1-8, includes a main frame 1, a wringing frame 2, first fixing columns 3, a second fixing column 4, an electric motor 5, a first rotating shaft 6, a second rotating shaft 7, a gear train 8, wringing wheels 9, a conveying mechanism 10 and a reciprocating mechanism 11. The first fixing column 3 is fixedly connected to each of front and rear sides of a left side of an upper portion of the main frame 1 via bolts, and the wringing frame 2 for treating construction waste is provided between the first fixing columns 3, the second fixing column 4 is provided on the rear side of the left side of the upper portion of the main frame 1, the electric motor 5 is fixedly connected to the second fixing column 4 via bolts, the first rotating shaft 6 is rotatably provided on a left side of a lower portion of the wringing frame 2, and a rear side of the first rotating shaft 6 is connected to an output shaft of the electric motor 5 via a coupling, the second rotating shaft 7 is rotatably provided on a right side of the lower portion of the wringing frame 2, the gear train 8 is connected between a front side of the first rotating shaft 6 and a front side of the second rotating shaft 7, the gear train 8 includes two gears meshed with each other, the wringing wheel 9 for wringing the construction waste is provided on each of middle parts of the first rotating shaft 6 and the second rotating shaft 7, the conveying mechanism 10 for conveying the wringed construction waste is provided between a left side of the main frame 1 and the wringing frame 2, the reciprocating mechanism 11 for filtering the wringed construction waste is provided between a lower portion of the main frame 1 and the conveying mechanism 10.

Figure 6:
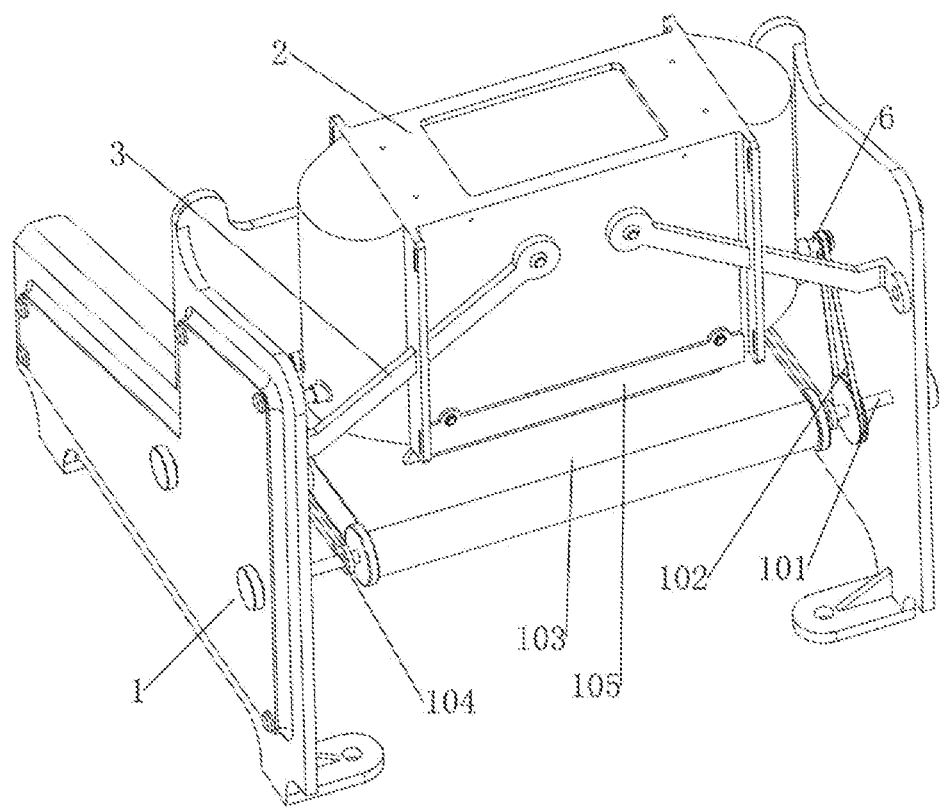
FIG. 6 is a perspective view of a conveying mechanism of the present disclosure.

Referring to FIG. 6, the conveying mechanism 10 includes third rotating shafts 101, a deceleration belt 102, a conveying belt 103, fixing rods 104 and guiding plates 105, two third rotating shafts 101 are rotatably provided on a left side of a middle portion of the main frame 1, and the deceleration belt 102 is wound between a front side of the third rotating shaft 101 on a left side and a front side of the first rotating shaft 6 via transmission wheels, the conveying belt 103 for conveying the wringed construction waste is wound between the third rotating shafts 101 via a conveying wheel, the fixing rod 104 is rotatably provided between front and rear sides of each of the two third rotating shafts 101, and the guiding plate 105 for guiding the construction waste falling downwards is fixedly connected to each of the left and right sides of the lower portion of the wringing frame 2 via bolts.

Figure 7:
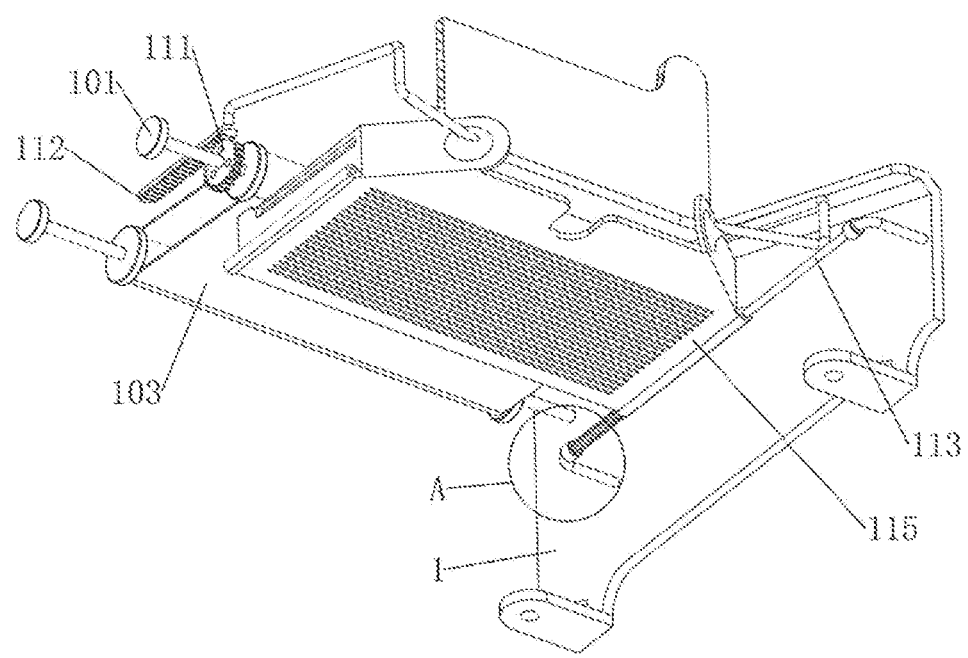
FIG. 7 is a perspective view of a reciprocating mechanism of the present disclosure.
Figure 8:
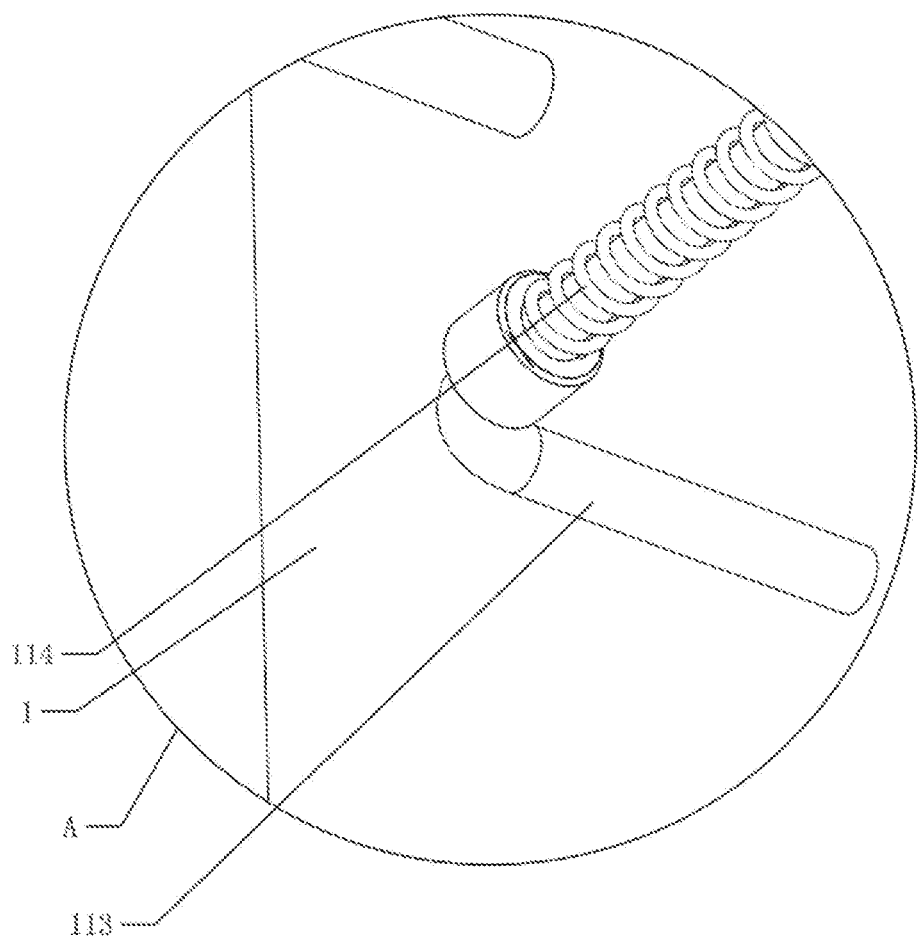
FIG. 8 is an enlarged perspective view of a section A of the present disclosure.

Referring to FIGS. 7 and 8, the reciprocating mechanism 11 includes partially toothless gears 111, first racks 112, first sliding rods 113, first linear springs 114 and a filtering plate 115, each of front and rear sides of the third rotating shaft 101 on a right side is keyed with the partially toothless gear 111, and each of front and rear sides of a right side of the lower portion of the main frame 1 is provided with the first sliding rod 113, the filtering plate 115 for filtering the wringed construction waste is slidably provided between the first sliding rods 113, an inner bottom surface of the filtering plate 115 is obliquely provided, and the first linear spring 114 is connected between each of the first sliding rods 113 and a left side of the filtering plate 115, each of front and rear sides of a right side of the filtering plate 115 is provided with the first rack 112, and each of the first racks 112 is meshed with the partially toothless gear 111 on a same side.

When the equipment is used, a suitable amount of construction waste is first put into the wringing frame 2, the electric motor 5 is turned on, and the output shaft of the electric motor 5 rotates to drive the first rotating shaft 6 and the wringing wheel 9 on a left side to rotate, the first rotating shaft 6 drives the second rotating shaft 7 and the wringing wheel 9 on a right side to rotate via the gear train 8, so that the wringing wheels 9 wring the construction waste. The wringed construction waste falls downwards onto the conveying belt 103 via the guiding plate 105 that guides the wringed construction waste, so that the wringed construction waste can fall onto the conveying belt 103 accurately. Further, the first rotating shaft 6 rotates to drives the third rotating shaft 101 on the left side to rotate via the transmission wheel and the deceleration belt 102, the third rotating shaft 101 on the left side drives the third rotating shaft 101 on the right side to rotate via the conveying wheel and the conveying belt 103, so that the conveying belt 103 transports the wringed construction waste rightwards, and the wringed waste falls onto the filtering plate 115. Further, when the third rotation shaft 101 on the right side rotates, the partially toothless gears 111 are driven to rotate, and the partially toothless gears 111 drive the first racks 112 to move rightwards, and then drive the filtering plate 115 to move rightwards, the first linear springs 114 are stretched. When the partially toothless gears 111 are separated from the first racks 112, so that the filtering plate 115 and the first racks 112 are driven to move leftward and reset under the action of the first linear springs 114. In this way, the partially toothless gears 111 are repeatedly meshed with and separated from the first racks 112, so that the filtering plate 115 is repeatedly moved from side to side, so as to screen the wringed construction waste, so that smaller debris falls directly downwards and the larger iron blocks and foreign objects and the like can slide rightwards via the filtering plate 115 as the inner bottom surface thereof is provided obliquely, thereby facilitating the staff to recycle the recyclable objects.

Embodiment 2

Figure 9:
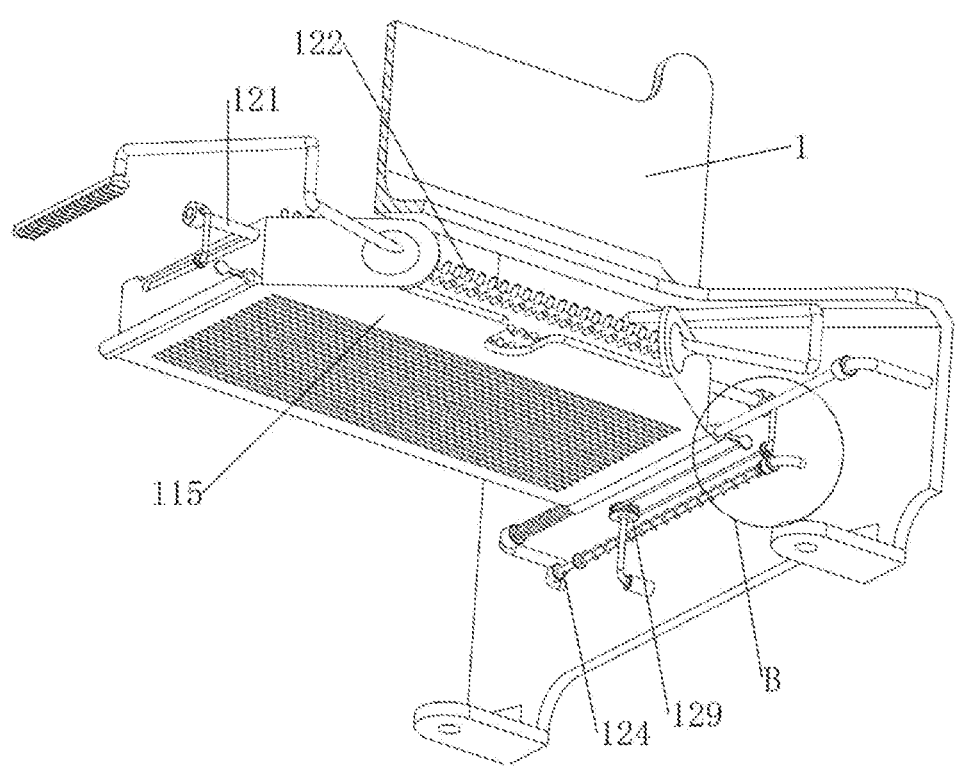
FIG. 9 is a perspective view of an adsorption mechanism of the present disclosure.
Figure 10:
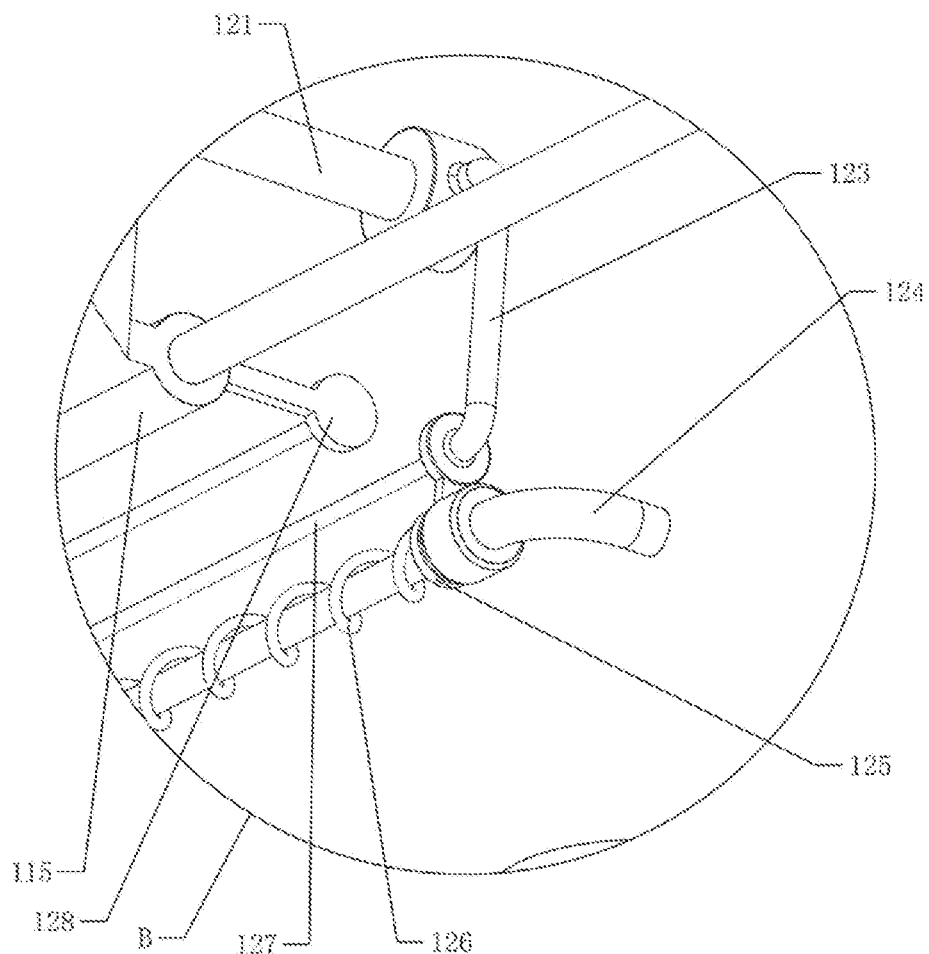
FIG. 10 is an enlarged perspective view of a section B of the present disclosure.

Based on the Embodiment 1, referring to FIGS. 1, 9 and 10, an adsorption mechanism 12 is further included. The adsorption mechanism 12 includes a fourth rotating shaft 121, an adsorption wheel 122, first connecting rods 123, second sliding rods 124, sliding sleeves 125, second linear springs 126, dragging strings 127, second connecting rods 128 and guiding wheels 129. The fourth rotating shaft 121 is slidably and rotatably provided on an upper portion of the filtering plate 115, the adsorption wheel 122 for adsorbing iron blocks is provided on a middle portion of the fourth rotating shaft 121, each of front and rear sides of the fourth rotating shaft 121 is provided with the first connecting rod 123, each of front and rear sides of the lower portion of the main frame 1 is provided with the second sliding rod 124, each of the second sliding rods 124 is slidably provided with the sliding sleeve 125, and each of the sliding sleeves 125 is connected to the first connecting rod 123 on a same side, the second linear spring 126 is connected between each of the sliding sleeves 125 and the second sliding rod 124 on a same side, and each of front and rear sides of a right side of a lower portion of the filtering plate 115 is provided with the second connecting rod 128, the dragging string 127 is connected between each of the second connecting rods 128 and the sliding sleeve 125 on a same side, and each of front and rear sides of a left side of the lower portion of the main frame 1 is provided with the guiding wheel 129, each of the dragging strings 127 wraps around the guiding wheel 129 on a same side.

When the filtering plate 115 moves rightwards, the second connecting rods 128 are further driven to move rightwards, and the second connecting rods 128 drive the sliding sleeves 125 to move leftwards via the dragging strings 127, the second linear springs 126 are compressed, and the sliding sleeves 125 drive the first connecting rods 123 to move leftwards, and further drive the fourth rotating shaft 121 to move leftwards, the fourth rotating shaft 121 drives the adsorption wheel 122 to move leftwards. When the filtering plate 115 moves leftwards, the second connecting rods 128 are further driven to move leftwards, the dragging strings 127 are loosened, and then the sliding sleeves 125, the first connecting rods 123, the fourth rotating shaft 121 and the adsorption wheel 122 are driven to move rightwards to reset under the action of the second linear springs 126. In this way, the adsorption wheel 122 adsorbs the iron blocks on the filtering plate 115, thereby facilitating the staff to collect the iron blocks.

Figure 2:
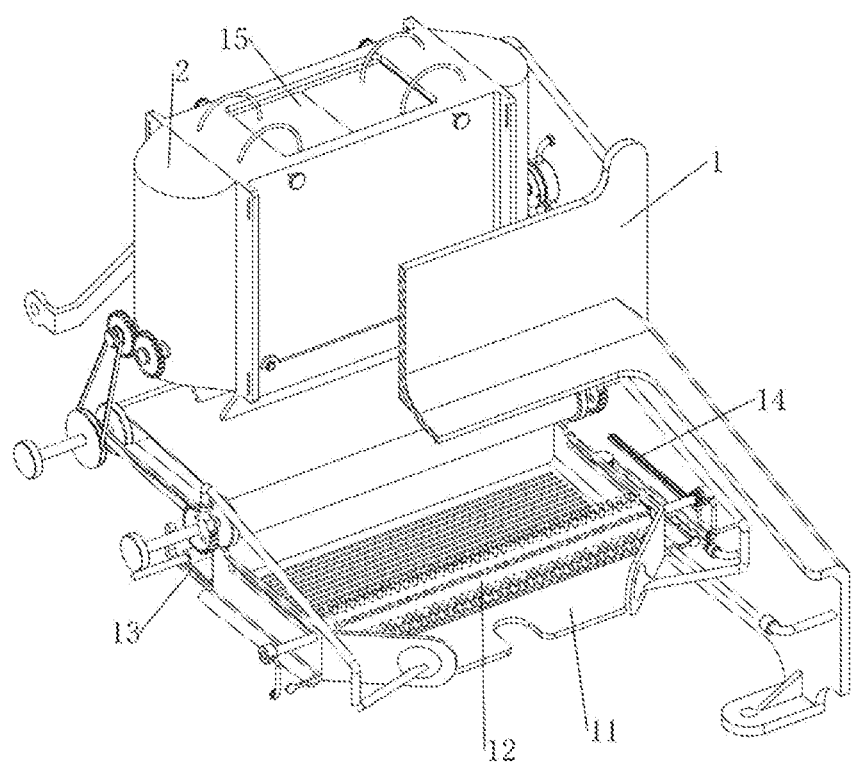
FIG. 2 is a first partial perspective view of the present disclosure.
Figure 3:
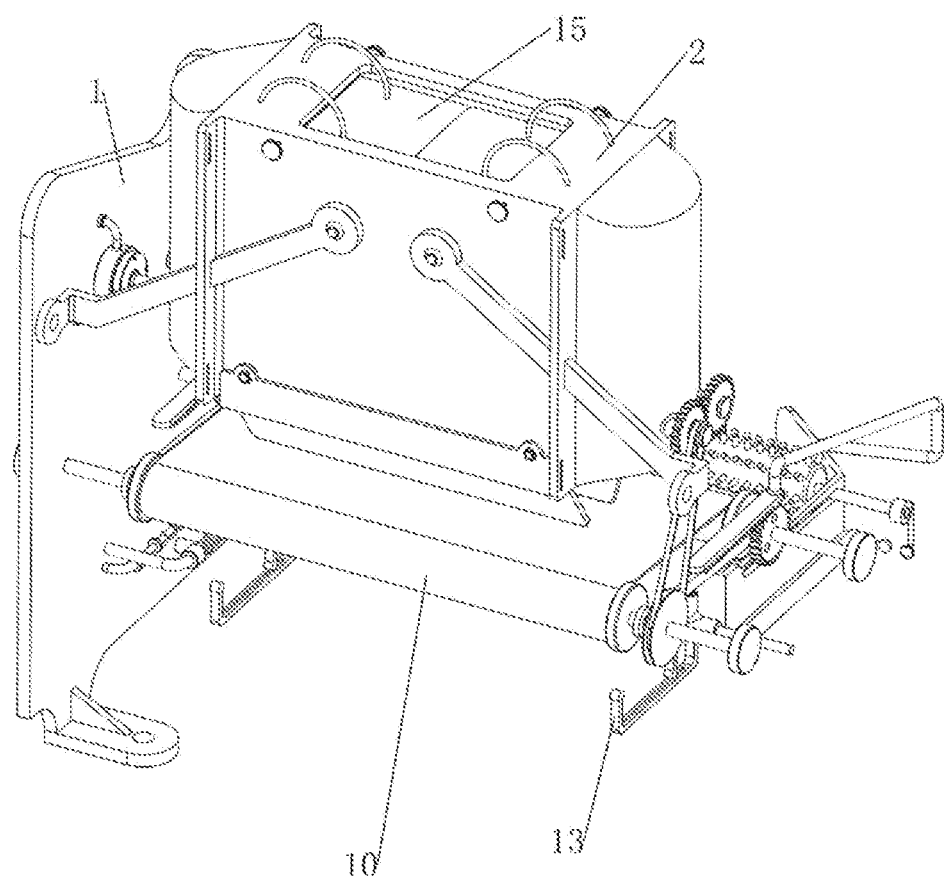
FIG. 3 is a second partial perspective view of the present disclosure.
Figure 4:
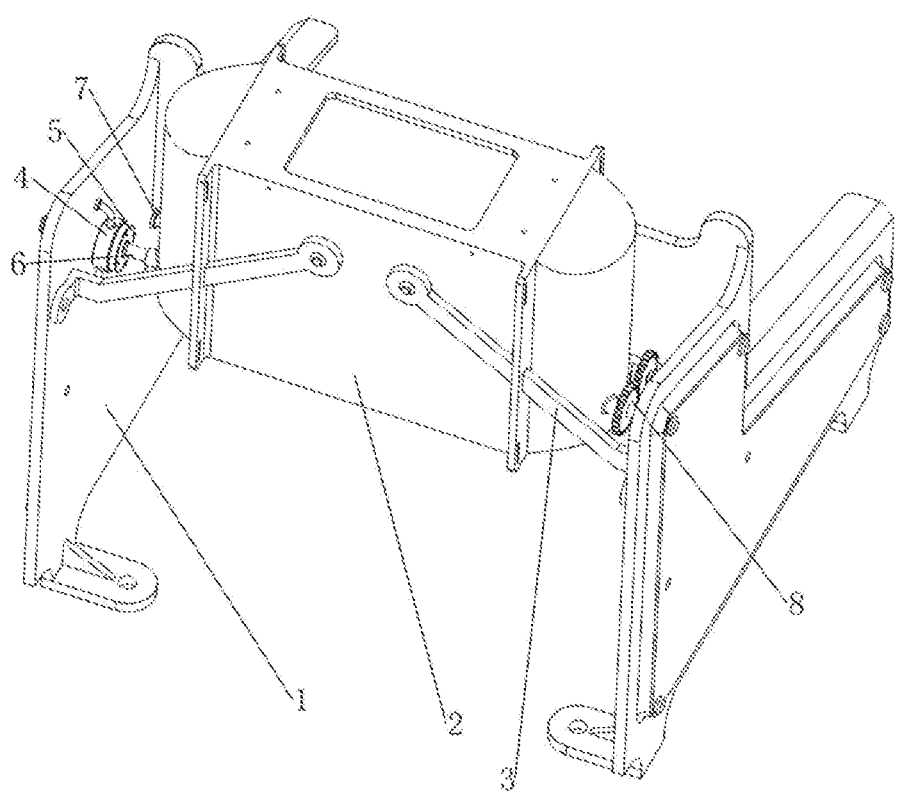
FIG. 4 is a third partial perspective view of the present disclosure.
Figure 5:
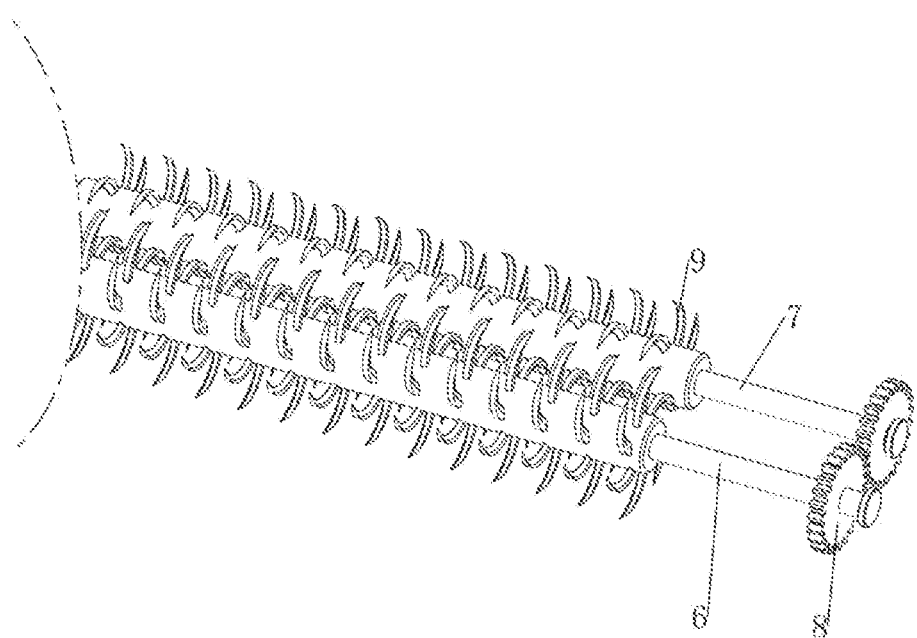
FIG. 5 is a fourth partial perspective view of the present disclosure.
Figure 11:
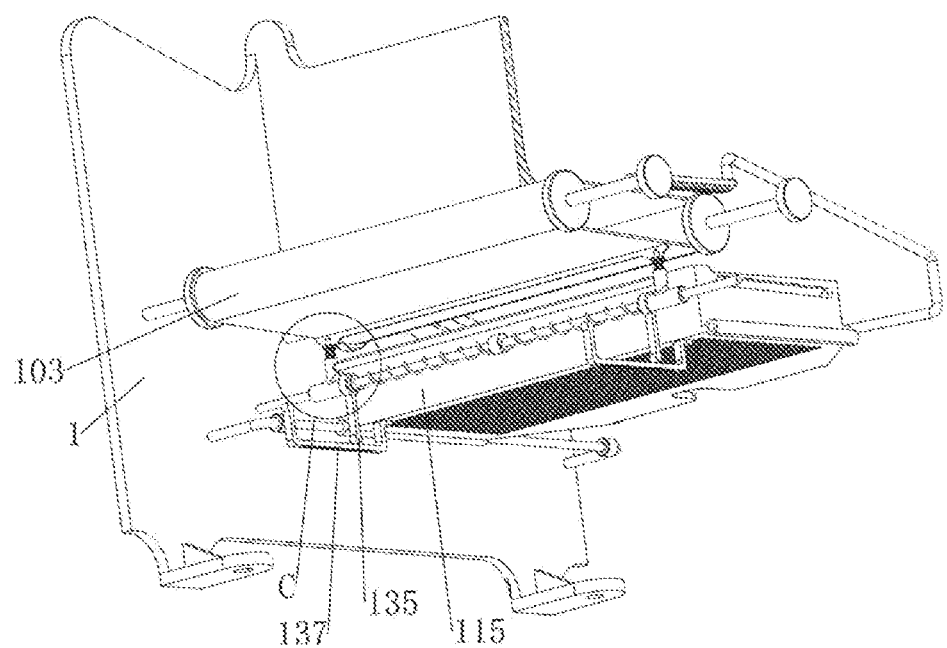
FIG. 11 is a perspective view of a scraping mechanism of the present disclosure.
Figure 12:
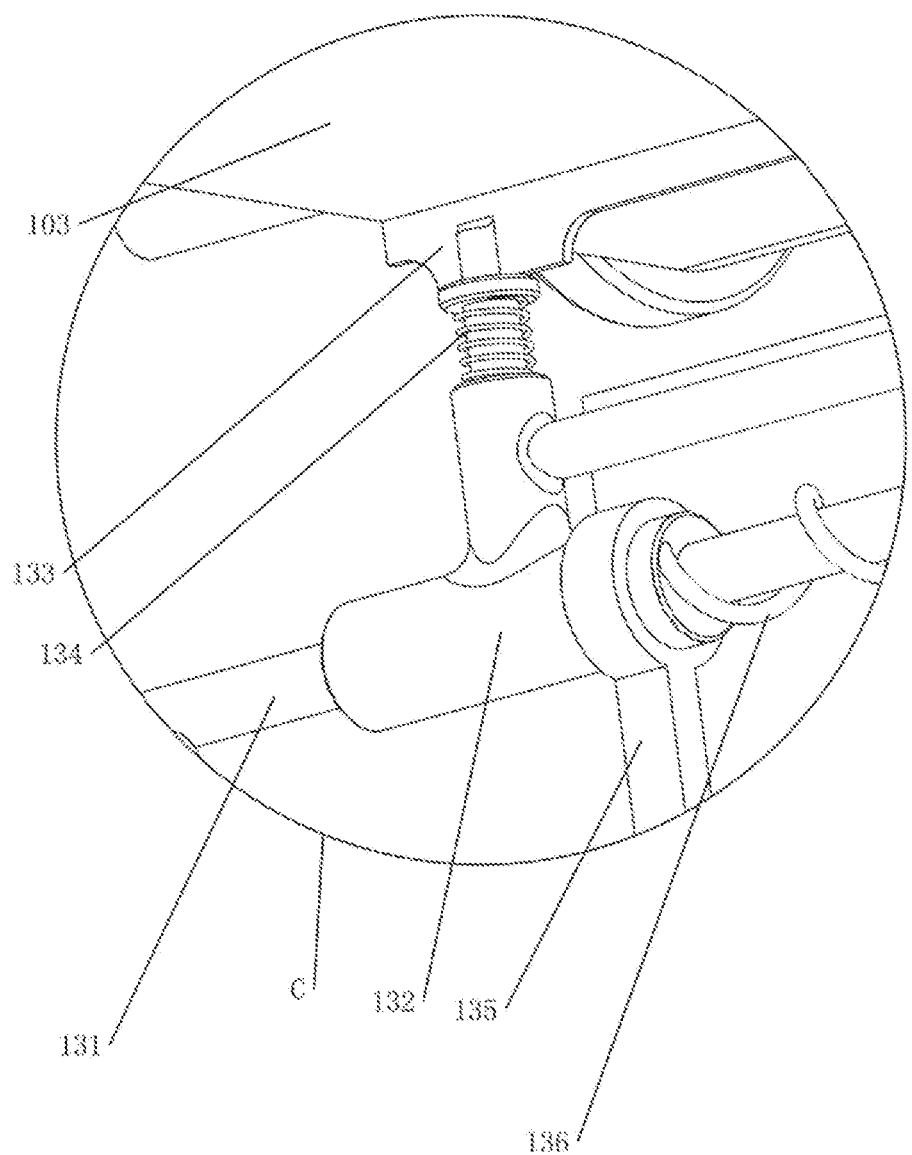
FIG. 12 is an enlarged perspective view of a section C of the present disclosure.

Referring to FIGS. 2, 11 and 12, a scraping mechanism 13 is further included, and the scraping mechanism 13 includes a third fixing column 131, rotating sleeves 132, a scraper 133, third linear springs 134, rotating rods 135, torsion springs 136 and pushing rods 137. The third fixing column 131 is provided on the left side of the lower portion of the main frame 1, the rotating sleeves 132 are rotatably provided on the third fixing column 131, the scraper 133 for cleaning the conveying belt 103 is slidably provided on the rotating sleeves 132, the scraper 133 is in contact with the conveying belt 103, the third linear spring 134 is connected between the scraper 133 and each of the rotating sleeves 132, and the rotating rod 135 is provided on each of a front side and a rear side of a lower side of the rotating sleeve 132, two torsion springs 136 are connected between the rotating sleeves 132 and the third fixing column 131, the pushing rod 137 is provided on each of front and rear sides of a left side of a bottom of the filtering plate 115, after the pushing rods 137 move, each of the pushing rods 137 is in contact with the rotating rod 135 on a same side.

In the initial state, the third linear springs 134 are compressed, when the filtering plate 115 moves rightwards, the pushing rods 137 are further driven to move rightwards, when the pushing rods 137 are in contact with the rotating rods 135, the rotating rods 135 are further driven to rotate, and the rotating rods 135 drive the rotating sleeves 132 to rotate, the torsion springs 136 are deformed, and the rotating sleeves 132 drive the scraper 133 and the third linear springs 134 to rotate, so that the scraper 133 always keeps contacting the conveying belt 103 under the action of the third linear springs 134. When the filtering plate 115 moves leftwards, the pushing rods 137 are further driven to move leftwards to separate from the rotating rods 135, and the rotating rods 135, the rotating sleeves 132, the scraper 133 and the third linear springs 134 are driven to reversely reset under the action of the torsion springs 136, the third linear springs 134 are compressed. In this way, the back and forth rotation of the scraper 133 scrape mud, foreign objects, and the like from the conveying belt 103, and thereby the conveying belt 103 is cleaned to prevent mud from sticking recyclable objects to the conveying belt 103.

Figure 13:
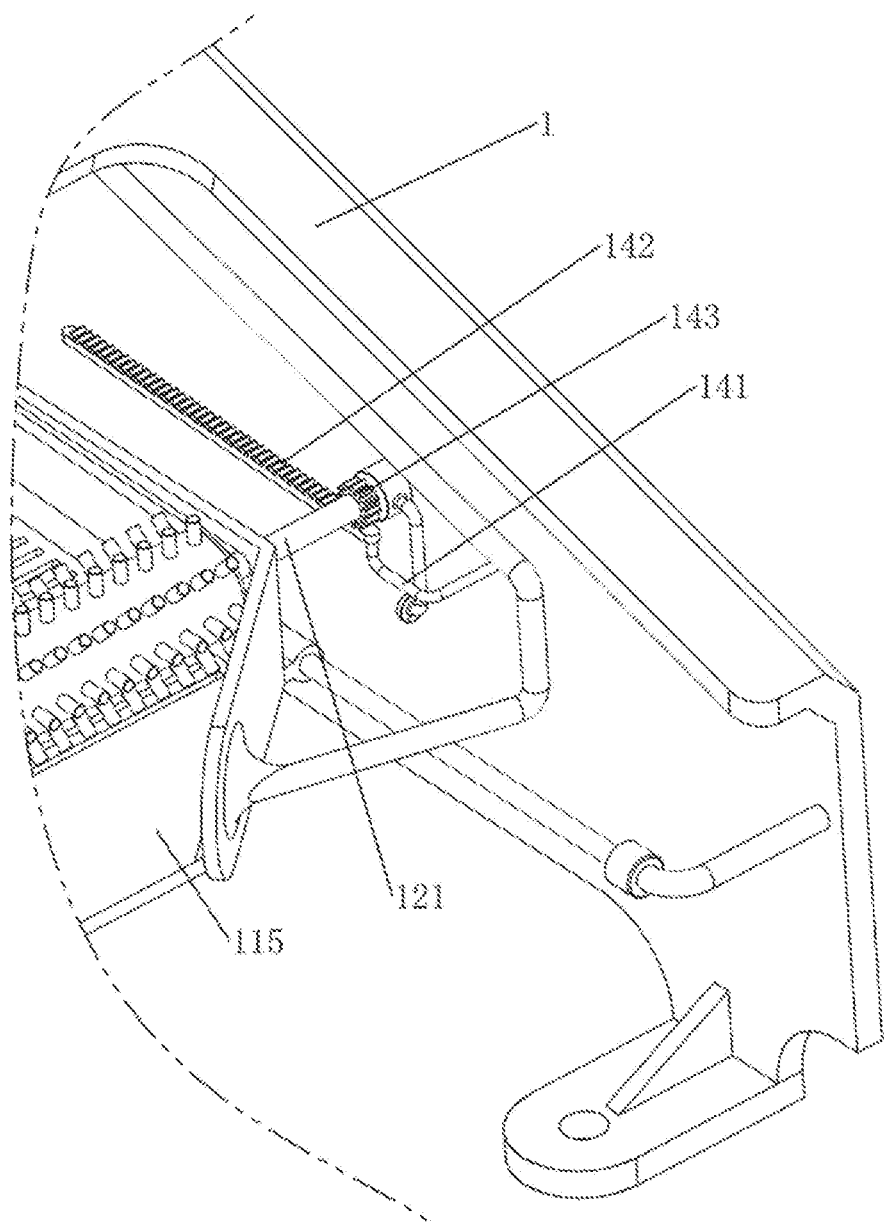
FIG. 13 is a perspective view of a flipping mechanism of the present disclosure.

Referring to FIGS. 1 and 13, a flipping mechanism 14 is further included. The flipping mechanism 14 includes fourth fixing columns 141, second racks 142 and straight gears 143. The fourth fixing column 141 is provided on each of the front and rear sides of the right side of the lower portion of the main frame 1, the second rack 142 is provided on each of the fourth fixing columns 141, each of front and rear sides of the fourth rotating shaft 121 is keyed with the straight gear 143, each of the straight gears 143 is meshed with the second rack 142 on a same side.

When the fourth rotation shaft 121 moves leftwards, the straight gears 143 are driven to move leftwards, and the straight gears 143 are meshed with the second racks 142, so as to drive the straight gears 143 to rotate, and the straight gears 143 drive the fourth rotating shaft 121 to rotate, thereby driving the adsorption wheel 122 to rotate. When the fourth rotation shaft 121 moves rightwards, the straight gears 143 are driven to move rightwards, and the straight gears 143 are meshed with the second racks 142, so as to drive the straight gears 143 to rotate reversely, and the straight gears 143 drive the fourth rotating shaft 121 to rotate reversely, thereby driving the adsorption wheel 122 to rotate reversely. In this way, the adsorption wheel 122 can adsorb more iron blocks.

Figure 14:
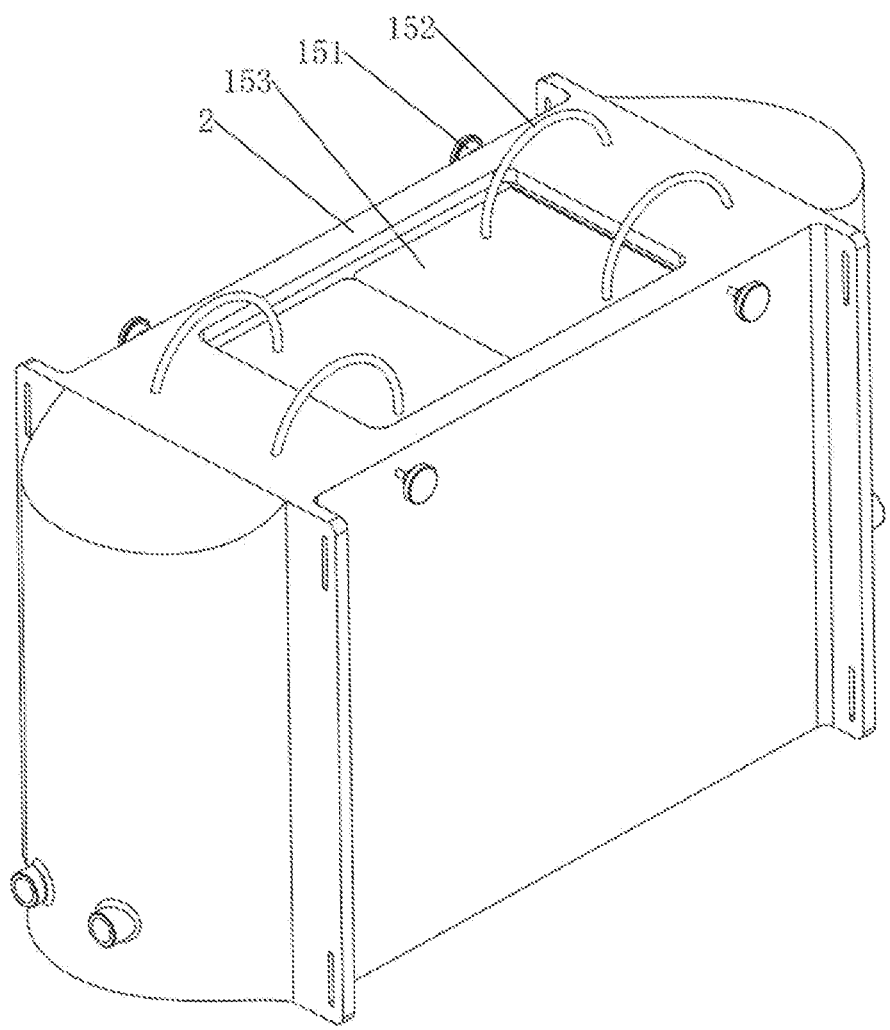
FIG. 14 is a first partial perspective view of a protection mechanism of the present disclosure.
Figure 15:
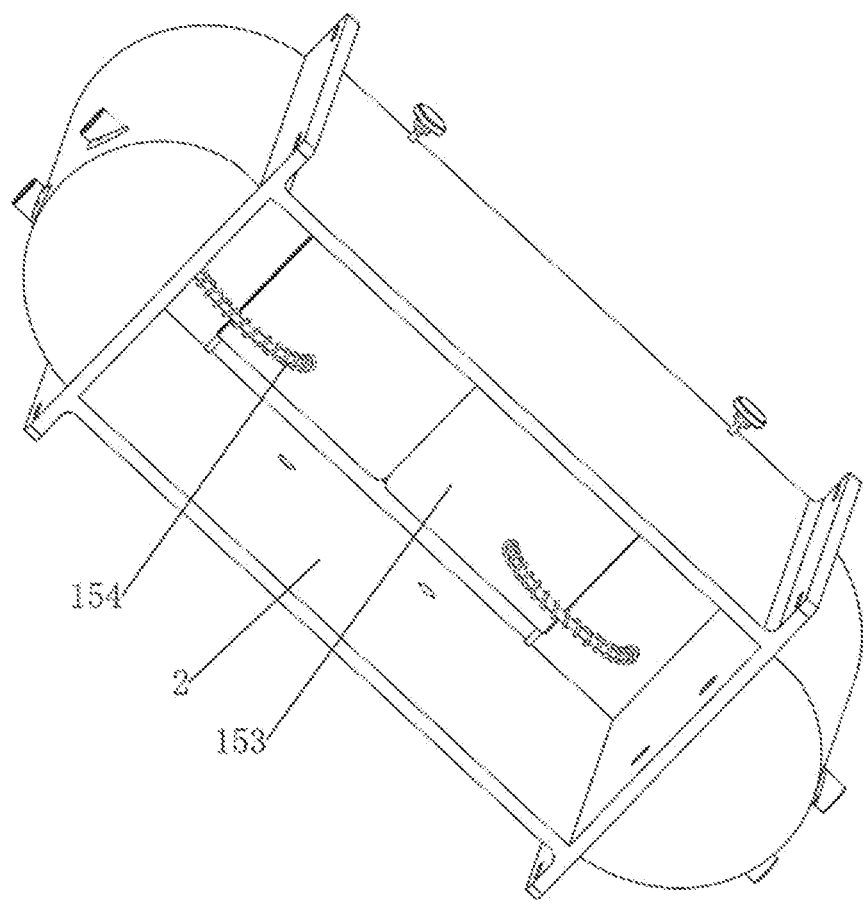
FIG. 15 is a second partial perspective view of the protection mechanism of the present disclosure.

Referring to FIGS. 1, 14 and 15, a protection mechanism 15 is further included. The protection mechanism 15 includes fifth rotating shafts 151, arc rods 152, baffles 153 and arc springs 154. The fifth rotating shaft 151 is rotatably provided on each of front and rear sides of an upper portion of the wringing frame 2, and two arc rods 152 are provided on each of the front and rear sides of the upper portion of the wringing frame 2, the baffle 153 for closing the wringing frame 2 is provided on each of the fifth rotating shafts 151, and each of the baffles 153 is slidably connected to two arc rods 152 on a same side, the arc spring 154 is connected between each of the arc rods 152 and the baffle 153 on a same side.

The construction waste is poured onto the baffles 153 by the staff, the baffles 153 are rotated to open under the action of gravity of the construction waste, and the arc springs 154 are compressed, so that the construction waste on the baffles 153 slides down into the wringing frame 2, and subsequently, the baffles 153 are driven to reverse and reset to be closed under the action of the arc springs 154. In this way, when the wringing wheels 9 wring the construction waste, debris can be prevented from splashing out to mistakenly damage the staff.

Although the embodiments of the present disclosure have been described in detail with reference to the drawings, the present disclosure is not limited to the above embodiments, and various changes can be made without departing from the scope of the present disclosure within the knowledge of those skilled in the art.

What is claimed is:

1. An environment-friendly construction waste treatment equipment for civil engineering, comprising a main frame, a wringing frame, first fixing columns, a second fixing column, an electric motor, a first rotating shaft, a second rotating shaft, a gear train, and wringing wheels, the first fixing column is provided on each of front and rear sides of a left side of an upper portion of the main frame, the wringing frame for treating construction waste is provided between the first fixing columns, the second fixing column is provided on the rear side of the left side of the upper portion of the main frame, and the electric motor is provided on the second fixing column, the first rotating shaft is rotatably provided on a left side of a lower portion of the wringing frame, a rear side of the first rotating shaft is connected to an output shaft of the electric motor via a coupling, and the second rotating shaft is rotatably provided on a right side of the lower portion of the wringing frame, the gear train is provided between a front side of the first rotating shaft and a front side of the second rotating shaft, the gear train is consisted of two gears meshed with each other, and the wringing wheel for wringing the construction waste is provided on each of middle parts of the first rotating shaft and the second rotating shaft, and a conveying mechanism and a reciprocating mechanism, wherein the conveying mechanism for conveying wringed construction waste is provided between a left side of the main frame and the wringing frame, the reciprocating mechanism for filtering the wringed construction waste is provided between a lower portion of the main frame and the conveying mechanism;

the conveying mechanism comprises two third rotating shafts, a deceleration belt, a conveying belt, fixing rods and guiding plates; the two third rotation shafts are rotatably provided on a left side of a middle portion of the main frame, the deceleration belt is wound between a front side of the third rotation shaft on a left side and a front side of the first rotation shaft via transmission wheels, the conveying belt for conveying the wringed construction waste is wound between the third rotating shafts via a conveying wheel, and the fixing rod is rotatably provided between front and rear sides of each of the two third rotating shafts, and the guiding plate for guiding the wringed construction waste falling downwards is provided on each of the left and right sides of the lower portion of the wringing frame;

the reciprocating mechanism comprises partially toothless gears, first racks, first sliding rods, first linear springs and a filtering plate, each of front and rear sides of the third rotating shaft on a right side is provided with the partially toothless gear, and each of front and rear sides of a right side of the lower portion of the main frame is provided with the first sliding rod, the filtering plate for filtering the wringed construction waste is slidably provided between the first sliding rods, the first linear spring is connected between each of the first sliding rods and a left side of the filtering plate, each of front and rear sides of a right side of the filtering plate is provided with the first rack, and each of the first racks is meshed with the partially toothless gear on a same side;

an adsorption mechanism for facilitating staff to collect iron blocks, the adsorption mechanism comprises a fourth rotating shaft, an adsorption wheel, first connecting rods, second sliding rods, sliding sleeves, second linear springs, dragging strings, second connecting rods and guiding wheels, an upper portion of the filtering plate is slidably and rotatably provided with the fourth rotating shaft, a middle portion of the fourth rotating shaft is provided with the adsorption wheel for adsorbing the iron blocks, the first connecting rod is provided on each of front and rear sides of the fourth rotating shaft, and the second sliding rod is provided on each of front and rear sides of the lower portion of the main frame, the sliding sleeve is slidably provided on each of the second sliding rods, and each of the sliding sleeves is connected to the first connecting rod on a same side, the second linear spring is connected between each of the sliding sleeves and the second sliding rod on a same side, the second connecting rod is provided on each of front and rear sides of a right side of a lower portion of the filtering plate, the dragging string is connected between each of the second connecting rods and the sliding sleeve on a same side, the guiding wheel is provided on each of front and rear sides of a left side of the lower portion of the main frame, each of the dragging strings wraps around the guiding wheel on a same side.

2. The environment-friendly construction waste treatment equipment for civil engineering of claim 1, further comprises a scraping mechanism for cleaning the conveying belt, the scraping mechanism comprises a third fixing column, rotating sleeves, a scraper, third linear springs, rotating rods, torsion springs and pushing rods, the third fixing column is provided on the left side of the lower portion of the main frame, the rotating sleeves are rotatably provided on the third fixing column, the scraper for cleaning the conveying belt is slidably provided on the rotating sleeves, and the scraper is in contact with the conveying belt, the third linear spring is connected between the scraper scrapers and each of the rotating sleeves, the rotating rod is provided on both of a front side and a rear side of a lower side of the rotating sleeve, two torsion springs are connected between the rotating sleeves and the third fixing column, and the pushing rod is provided on each of front and rear sides of a left side of a bottom of the filtering plate, after the pushing rods move, each of the pushing rods is in contact with the rotating rod on a same side.

3. The environment-friendly construction waste treatment equipment for civil engineering of claim 2, further comprises a flipping mechanism for increasing adsorption range of the adsorption wheel, the flipping mechanism comprises fourth fixing columns, second racks and straight gears, wherein the fourth fixing column is provided on each of the front and rear sides of the right side of the lower portion of the main frame, each of the fourth fixing columns is provided with the second rack, each of front and rear sides of the fourth rotating shaft is provided with the straight gear, each of the straight gears is meshed with the second rack on a same side.

4. The environment-friendly construction waste treatment equipment for civil engineering of claim 3, further comprises a protection mechanism for preventing debris from splashing, the protection mechanism comprises fifth rotating shafts, two arc rods, baffles and arc springs, wherein the fifth rotating shaft is rotatably provided on each of front and rear sides of an upper portion of the wringing frame, the two arc rods are provided on each of the front and rear sides of the upper portion of the wringing frame, and the baffle for closing the wringing frame is provided on each of the fifth rotating shafts, each of the baffles is slidably connected to two arc rods on a same side, and the arc spring is connected between each of the arc rods and the baffle on a same side.

5. The environment-friendly construction waste treatment equipment for civil engineering of claim 1, wherein an inner bottom surface of the filtering plate is obliquely provided.

* * * * *